US008529690B1

United States Patent
Shen et al.

(10) Patent No.: US 8,529,690 B1
(45) Date of Patent: Sep. 10, 2013

(54) PROCESS FOR CONTROLLING A CRYSTAL FORM OF ALITE IN PORTLAND CEMENT CLINKER

(75) Inventors: Xiaodong Shen, Jiangsu (CN); Suhua Ma, Jiangsu (CN); Xuerun Li, Jiangsu (CN); Lin Chen, Jiangsu (CN); Weiqiang Zhou, Jiangsu (CN); Song Deng, Jiangsu (CN)

(73) Assignee: Nanjing University of Technology, Jiangsu (CN)

( * ) Notice: Subject to any disclaimer, the term of this patent is extended or adjusted under 35 U.S.C. 154(b) by 0 days.

(21) Appl. No.: 13/509,793

(22) PCT Filed: Jul. 15, 2010

(86) PCT No.: PCT/CN2010/075183
§ 371 (c)(1),
(2), (4) Date: Mar. 28, 2013

(87) PCT Pub. No.: WO2011/057505
PCT Pub. Date: May 19, 2011

(30) Foreign Application Priority Data

Nov. 13, 2009 (CN) .......................... 2009 1 0212646

(51) Int. Cl.
C04B 7/48 (2006.01)
C04B 7/43 (2006.01)
C04B 7/52 (2006.01)

(52) U.S. Cl.
USPC ............ 106/749; 106/739; 106/748; 106/750

(58) Field of Classification Search
USPC .................................. 106/739, 748, 749, 750
See application file for complete search history.

(56) References Cited

U.S. PATENT DOCUMENTS

| | | | |
|---|---|---|---|
| 6,599,123 B2 * | 7/2003 | Ramirez-Tobias et al. ..... | 432/14 |
| 6,695,910 B2 * | 2/2004 | Classen et al. ................ | 106/739 |
| 6,730,162 B1 * | 5/2004 | Li et al. .......................... | 106/772 |
| 7,001,454 B2 * | 2/2006 | Lopez-Gonzales et al. .. | 106/739 |
| 7,850,776 B2 * | 12/2010 | Gartner et al. ................ | 106/692 |
| 8,021,478 B2 * | 9/2011 | Ramirez Tobias et al. ... | 106/739 |
| 8,177,903 B2 * | 5/2012 | Walenta et al. ............... | 106/695 |
| 8,268,071 B2 * | 9/2012 | Pasquier et al. ............... | 106/693 |

FOREIGN PATENT DOCUMENTS

| | | |
|---|---|---|
| CN | 1587157 A | 3/2005 |
| CN | 101134647 A | 5/2008 |
| CN | 101717210 A | 6/2010 |
| EP | 0 812 811 A1 | 12/1997 |

OTHER PUBLICATIONS

International Search Report, Application No. PCT/CN2010/075183, Oct. 28, 2010, pp. 4.

* cited by examiner

*Primary Examiner* — Anthony J Green
(74) *Attorney, Agent, or Firm* — Knobbe, Martens, Olson & Bear, LLP

(57) ABSTRACT

The present invention relates to a process of controlling crystal form of Alite in Portland cement clinker, wherein the said Portland cement clinker is thermally treated in order to change the crystal form of Alite in Portland cement clinker, so as to improve performance of resulting Portland cement clinker. The said process of present invention is easy and feasible.

9 Claims, 4 Drawing Sheets

PROCESS FOR CONTROLLING A CRYSTAL FORM OF ALITE IN PORTLAND CEMENT CLINKER

CROSS-REFERENCE TO RELATED APPLICATIONS

This Application is the US National Phase under 35 U.S.C. §371 of International Application No. PCT/CN2010/075183, filed Jul. 15, 2010, which was published in Chinese as International Publication No. WO/2011/057505 on May 19, 2010, and claims the benefit of CN 200910212646.5, filed on Nov. 13, 2009. Each of these references is hereby incorporated by reference in their entirety.

BACKGROUND

1. Field of the Inventions

The present inventions relate to a process for controlling the polymorph of Alite in Portland cement clinker, including, for example, methods for improving the performance of Portland cement clinker.

2. Description of the Related Art

The cement industry is growing rapidly in China. The output of cement in China in 2008 was around 1.45 billion tons, which took up around 50% of global cement total output, and China has been the No. 1 cement producing country in the world for 24 consecutive years. Due to the fact that the Chinese economy is in the phase of rapid development, it is predicted that China's cement output will continuously increase at a rate of 10%. Although lots of cement is produced in China, the overall cement quality is relatively low. Thus, the lifetime of concrete work is influenced. Therefore, the performance of cement has to be improved.

SUMMARY OF THE INVENTION

Portland cement mainly consists of Portland cement clinker, calcium sulfate and composite material. In order to improve the performance of Portland cement, the performance of Portland cement clinker has to be improved. Portland cement clinker mainly consists of Alite, Belite, $C_3A$ ($3CaO.Al_2O_3$) and $C_4AF$ ($4CaO.3Al_2O_3.Fe_2O_3$). Alite is the main contributor to the cementitious property of Portland cement clinker, while it is also the main energy consumer. Therefore, the content of $C_3S$ ($CaSiO_5$) in clinker or its activity has to be improved in order to improve the cementitious property of Portland cement clinker. However, the increase of the content of $C_3S$ in clinker will lead to increase of energy consumption. Therefore, under the national demand of energy saving and emission reduction, one of the effective measures to improve the performance of cement clinker is to improve the activity of Alite in Portland cement clinker. At present, doping is the most commonly used method to improve the activity of Alite, where high-activity Alite is obtained via modification of its crystal form.

An aspect of at least one of the inventions disclosed herein includes the realization that controlling the crystal form of Alite can improve the performance of Portland cement clinker, providing a process for controlling crystal form of Alite in Portland cement clinker. As a result of this process, the crystal form of Alite in Portland cement clinker is changed and therefore the performance of Portland cement clinker is improved.

In order to realize this object, the technical scheme of present invention is: a process for controlling the crystal form of Alite in Portland cement clinker, where the process includes the following steps:

(1) A prepared Portland cement raw meal is calcined;

(2) Portland cement raw meal is heated to 1400~1600° C. at a rate of 1~35° C. per min, and kept at this temperature and then naturally cooled;

(3) When its temperature is at 600~800° C., the cooled clinker is heated at a rate of 1~35° C. per minute until it reaches 700~1300° C. The clinker is kept at this temperature, and then it is naturally cooled;

(4) The cooled clinker is grounded to powder with the aid of a ball mill.

In another embodiment, a process for controlling the crystal form of Alite in Portland cement clinker includes the following steps:

(1B) A prepared Portland cement raw meal is calcined;

(2B) Portland cement raw meal is heated to 1400~1600° C. at a rate of 1~35° C. per minute, kept at this temperature and then it is transferred to a cooler, where it is cooled at a rate of 40~80° C. per minute;

(3B) When the temperature reaches 700~1300° C., it is kept at this temperature;

(4B) The clinker is naturally cooled; the cooled clinker is grounded to powder with the aid of ball mill.

The holding time of steps (2), (3), (2B) and (3B) is preferred to be 5~120 min, respectively. The specific surface area of the grounded powder of steps (4) and (4B) is preferred to be 340~360 m²/kg.

In steps (1) and (1B), the prepared cement raw meal is calcined to form clinker according to regular processing parameters. In alternative embodiments, calcined clinker could also be directly used in the following thermal treatment.

The present inventions relate to a process for controlling polymorph of Alite in Portland cement clinker, where the Portland cement clinker is thermally treated so that the crystal form of Alite in Portland cement clinker is changed and the performance of Portland cement clinker is improved. The present process is easy and feasible.

BRIEF DESCRIPTION OF THE DRAWINGS

FIG. 1-1 is an XRD pattern (2θ=32~33°) of Alite in a cement clinker without thermal treatment, FIG. 1-2 is an XRD pattern (2θ=51.5~52.7°) of Alite in a cement clinker without thermal treatment;

FIGS. 2-1 and 2-2 are an XRD pattern of Alite in a cement clinker at different 2θ (the clinker is produced by Huaihai Cement Factory and is thermally treated);

FIG. 2-1 is an XRD pattern (2θ=32~33°) of Alite in a cement clinker after thermal treatment, and FIG. 2-2 is an XRD pattern (2θ=51.0~52.5°) of Alite in a cement clinker after thermal treatment.

DETAILED DESCRIPTION OF THE PREFERRED EMBODIMENT

The present inventions are further illustrated with reference to the following examples. However, it may be understood that the present inventions are not limited to the following examples.

Example 1

Figure 1:
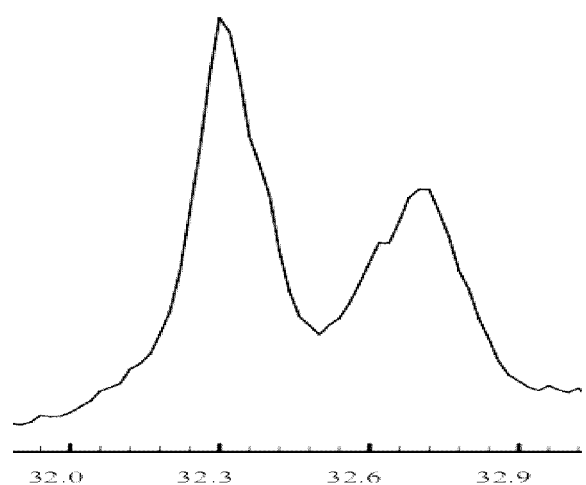
FIGS. 1-1 and 1-2 are XRD pattern of Alite in a cement clinker at different 2θ (the clinker is produced by Huaihai Cement Factory)
Figures 1, 2:
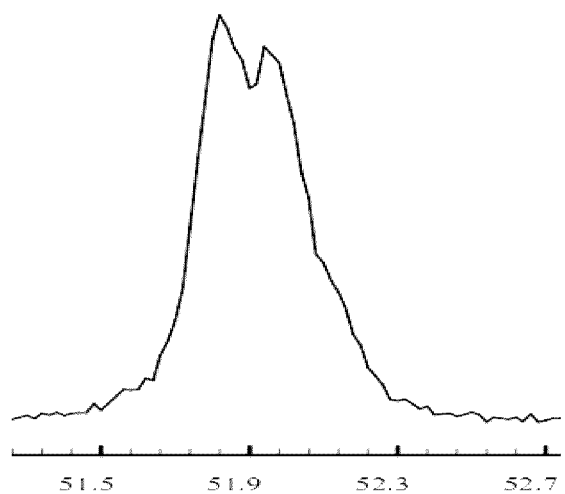
Figures 1, 2:
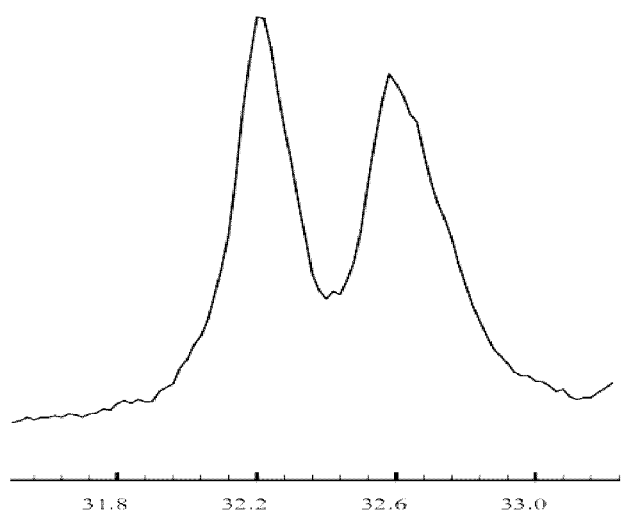
Figure 2:
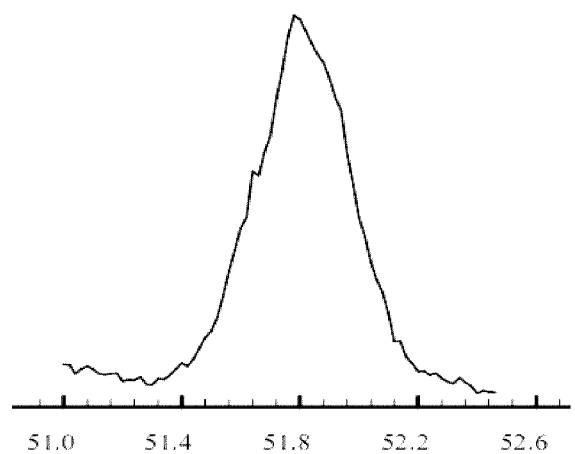

(1) A prepared Portland cement raw meal is heated to 1450° C. and calcined for 1 h; and then cooled to form a cement clinker (2) The temperature of the Portland cement raw meal is increased at a rate of 5° C./min until it reaches 1450° C., kept at this temperature for 30 min, and then is naturally cooled;

(3) The cooled clinker is heated at a temperature below 800° C. The temperature is increased at a rate of 10° C. per minute until it reaches 1100° C. Subsequently, the clinker is kept at this temperature for 60 min and then naturally cooled;

(4) The cooled clinker is grounded to a powder (e.g., with the aid of a ball mill. The specific surface area of this powder is 340 m$^2$/kg. The XRD pattern of Alite in the clinker of Xuchou Huaihai Cement Factory without thermal treatment are shown in FIG. 1 and FIG. 2. It can be seen that after calcination at 1100° C. for 60 min, the crystal form of Alite in Portland cement clinker of Huaihai Cement Factory is changed from M3 to M1.

(5) 4 g gypsum was added to 96 g of the cement clinker obtained as discussed above to form a mixture and this mixture is stirred uniformly, Subsequently, 29 mL water (ratio between water and cement w/c=0.29) was added and the mixture was stirred and molded to form 20×20×20 mm samples. The 3d and 28d compressive strength of the samples were determined.

Samples were first cured in a curing box for 24 h, where the relative humidity was 90% and the temperature was 20±2° C. Then a knockout sample was cured in a water curing case at 20±1° C. The comparison of resulting strength is shown in Table 1.

TABLE 1

| Compressive strength of Portland cement clinker paste (MPa) | | |
|---|---|---|
| Examples | 3 d | 28 d |
| Xuzhou Huaihai Cement Factory (Portland cement clinker) | 55.6 | 88.6 |
| Example 1 | 57.3 | 92.9 |

Example 2

(1) A prepared Portland cement raw meal was heated to 1480° C., calcined for 0.5 h, and then cooled;

(2) The temperature of the Portland cement raw meal was increased at a rate of 10° C./min until it reached 1500° C., and kept at this temperature for 60 min, and then it was naturally cooled;

(3) The cooled clinker was heated at a temperature below 700° C. The temperature was increased at a rate of 15° C./min until it reached 1000° C. Subsequently, the said clinker was kept at this temperature for 90 min, and then naturally cooled The clinker was grounded to powder (e.g., with the aid of a ball mill). The resulting specific surface area of this powder was 350 m$^2$/kg;

(4) 4 g gypsum was added to 96 g of the cement clinker obtained as discussed above. The mixture was stirred uniformly. Subsequently, 29 mL of water (ratio between water and cement w/c=0.29) was added, the said mixture was stirred and molded to form 20×20×20 mm samples. The 3d and 28d compressive strength of the samples was determined.

Samples were first cured in a curing box for 24 h, where the relative humidity was 90% and the temperature was 20±2° C. Then, a knockout sample was cured in a water curing box at 20±1° C. The comparison of resulting strength is shown in Table 2.

TABLE 2

| Compressive strength of Portland cement clinker paste (MPa) | | |
|---|---|---|
| Examples | 3 d | 28 d |
| Xuzhou Huaihai Cement Factory (Portland cement clinker) | 55.6 | 88.6 |
| Example 2 | 58.0 | 95.6 |

Example 3

(1) The prepared Portland cement raw meal was heated to 1450° C. and calcined for 1 h and then cooled;

(2) The temperature of said Portland cement raw meal was increased at a rate of 5° C./min until it reached 1450° C. and kept at this temperature for 60 minutes. Then, the mixture enters a cooling machine and the temperature of this mixture was decreased at a rate of 55° C./minute;

(3) The temperature was cooled to 1000° C. and the mixture was kept at this temperature for 60 minutes;

(4) 4 g gypsum was added to 96 g of the cement clinker obtained as discussed above, and the mixture was stirred uniformly. Subsequently, 29 mL water (ratio between water and cement w/c=0.29) was added. The mixture was stirred and molded to form 20×20×20 mm samples. The 3d and 28d compressive strength of samples was determined.

Samples were first cured in a curing box for 24 h, where the relative humidity was 90% and the temperature was 20±2° C., and then knockout sample was cured in a water curing box at 20±1° C. The comparison of resulting strength is shown in Table 3.

TABLE 3

| Compressive strength of Portland cement clinker paste (MPa) | | |
|---|---|---|
| Examples | 3 d | 28 d |
| Xuzhou Huaihai Cement Factory (Portland cement clinker) | 55.6 | 88.6 |
| Example 3 | 58.5 | 105.0 |

Example 4

(1) A prepared Portland cement raw meal was heated to 1450° C., calcined for 1 h, and then cooled;

(2) The temperature of this Portland cement raw meal was increased at a rate of 15° C./min until it reached 1500° C. and kept at this temperature for 30 minutes. Then, mixture entered a cooling machine and the temperature of mixture was decreased at a rate of 50° C. per minute.

(3) The temperature was cooled to 1100° C., and then the mixture was kept at this temperature for 30 minutes;

(4) 4 g gypsum was added to 96 g of the cement clinker obtained as discussed above and this mixture was stirred. Subsequently, 29 mL water (ratio between water and cement w/c=0.29) was added. The mixture was stirred and molded to form 20×20×20 mm samples. The 3d and 28d compressive strength of samples are determined.

Samples were first cured in a curing box for 24 h, where the relative humidity was 90% and the temperature was 20±2° C. Then a knockout sample was cured in a water curing case at 20±1° C. The comparison of resulting strength is shown in Table 4.

TABLE 4

| Compressive strength of Portland cement clinker paste (MPa) | | |
| --- | --- | --- |
| Examples | 3 d | 28 d |
| Xuzhou Huaihai Cement Factory (Portland cement clinker) | 55.6 | 88.6 |
| Example 4 | 56.8 | 91.5 |

What is claimed is:

1. A process for controlling a crystal form of Alite in Portland cement clinker, wherein the method comprises:
   (1) calcining prepared Portland cement raw meal to form a cement clinker, the calcining comprising;
   (2) increasing the temperature of the Portland cement raw meal at a rate of 1-35° C. per min to a first temperature of 1400-1600° C.;
   holding the temperature at the first temperature; and
   naturally cooling the formed cement clinker;
   heat treating cement clinker after the temperature of the cement clinker is reduced from the first temperature to 600-800° C., the heat treatment comprising:
   heating the cement clinker at a rate of 1-35° C. per minute until the cement clinker reaches a second temperature of 700-1300° C.;
   holding the temperature of the cement clinker at the second temperature; and
   naturally cooling the cement clinker; and
   grinding the cement clinker after cooling from the second temperature.

2. The process according to claim 1, wherein the holding times of the calcining and heat treatment operations are each 5-120 minutes, respectively.

3. The process according to claim 1, wherein the specific surface area of the ground clinker powder is 340-360 m$^2$/kg.

4. The process according to claim 1, wherein the cooled clinker is ground to a powder using a ball mill.

5. A process for controlling crystal form of Alite in Portland cement clinker, wherein the method comprises:
   calcining a Portland cement raw meal to form a cement clinker, the calcining comprising:
      heating the Portland cement raw meal to a first temperature between 1400-1600° C. at a rate of 1-35° C. per min;
      holding the temperature at the first temperature;
      cooling at a rate of 40-80° C. per min to a temperature of 700-1300° C.;
      holding the temperature at 700~1300° C.; and
      naturally cooling the formed cement clinker; and
   grinding the cooled clinker to a powder.

6. The process according to claim 5, wherein the holding times of the calcining and heat treatment operations are each 5-120 minutes, respectively.

7. The process according to claim 5, wherein the specific surface area of powder of the ground clinker is 340-360 m$^2$/kg.

8. The process according to claim 5, wherein the cooled clinker is ground to a powder using a ball mill.

9. The process according to claim 5, wherein cooling at a rate of 40-80° C. is performed using a cooling device.

* * * * *